United States Patent
Obermaier et al.

(10) Patent No.: US 6,219,217 B1
(45) Date of Patent: Apr. 17, 2001

(54) METHOD FOR THE ENERGY-SAVING OPERATION OF A CONTROL UNIT

(75) Inventors: Robert Obermaier, Thalmassing; Roland Gabler, Riedenburg, both of (DE); Brian Saloka, Roseville, MI (US); Wolfgang Köberl, Mauth (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/243,515

(22) Filed: Feb. 1, 1999

(30) Foreign Application Priority Data

Jan. 30, 1998 (DE) ............................................. 198 03 663

(51) Int. Cl.$^7$ .................................................. H01H 73/00
(52) U.S. Cl. ............................................ 361/115; 361/18
(58) Field of Search ............................. 361/115, 23, 20, 361/71, 72, 18

(56) References Cited

U.S. PATENT DOCUMENTS

| | | | |
|---|---|---|---|
| 5,396,635 | 3/1995 | Fung | 395/800 |
| 5,637,932 | 6/1997 | Koreeda et al. | 307/125 |
| 5,875,120 * | 2/1999 | Matsushima | 364/707 |

FOREIGN PATENT DOCUMENTS

| | | | |
|---|---|---|---|
| 43 07 226 A1 | 9/1993 | (DE) | G06F/1/32 |
| 0 140 814 A2 | 5/1985 | (EP) | G06F/1/00 |
| 0 744 322 A2 | 11/1996 | (EP) | B60R/16/02 |
| 2 235 797 | 3/1991 | (GB) | G06F/1/32 |

OTHER PUBLICATIONS

Japanese Patent Abstract No. 09128985 (Yasunori), dated May 16, 1997.

* cited by examiner

Primary Examiner—Stephen W. Jackson
(74) Attorney, Agent, or Firm—Herbert L. Lerner; Laurence A. Greenberg; Werner H. Stemer

(57) ABSTRACT

A control unit is supplied with a reset signal by a reset module at periodic time intervals. The control unit uses the period duration of the reset signal as a time base in order to measure the time. After a predefined number of period durations has expired, the propagation time of an internal timer is used for a precise determination of the time. As a result of the use of the reset signal, the control unit is predominantly in the sleep mode. As a result, the consumption of current is reduced.

5 Claims, 2 Drawing Sheets

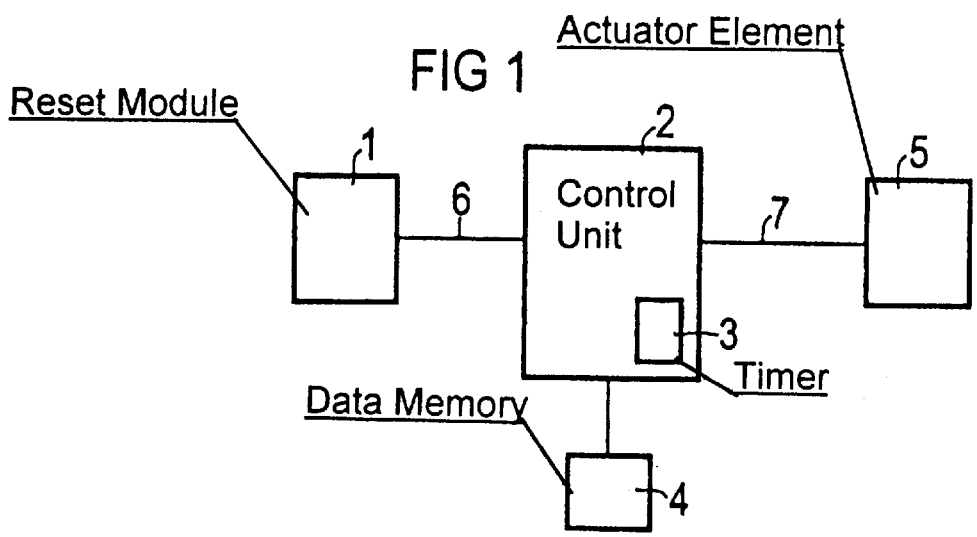
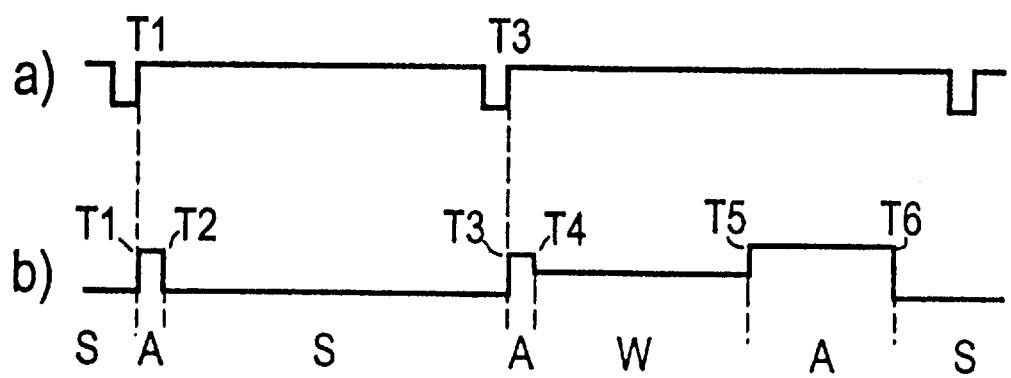

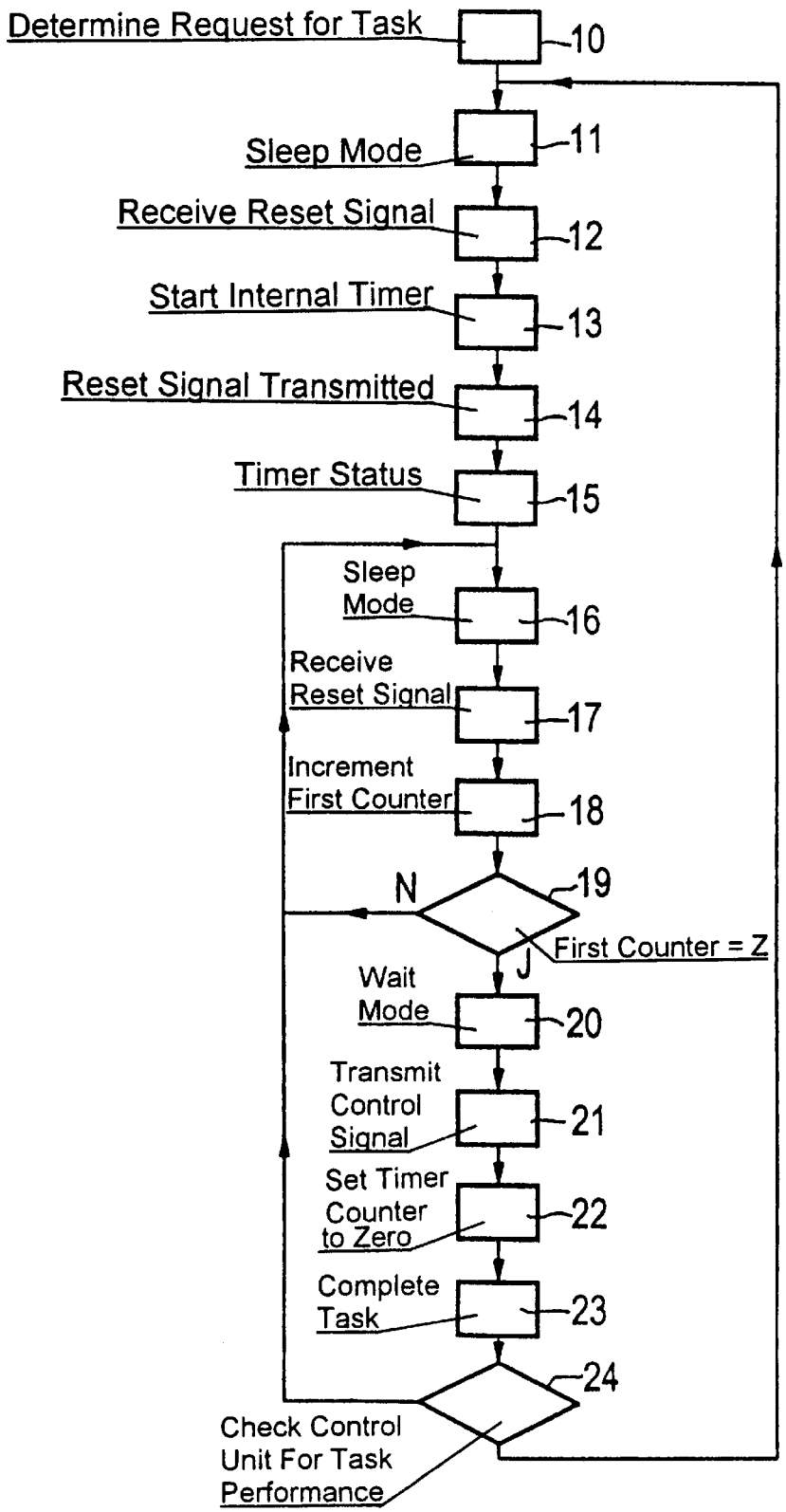

METHOD FOR THE ENERGY-SAVING OPERATION OF A CONTROL UNIT

BACKGROUND OF THE INVENTION

Field of the Invention

The invention relates to a method for an energy-saving operation of a control unit.

In order to save power, control units are operated in three different modes. In the active mode, the control unit carries out tasks and all functions are active. In a wait mode, the control unit does not carry out any tasks, but an internal timer is operated. In the wait mode, the control unit consumes less energy than in the active mode. The least energy is consumed in a sleep mode in which no activities whatsoever are active in the control unit, and the control unit has to be triggered by an external reset signal for the control unit to become active again.

SUMMARY OF THE INVENTION

It is accordingly an object of the invention to provide a method for the energy-saving operation of a control unit which overcomes the above-mentioned disadvantages of the prior art methods of this general type.

With the foregoing and other objects in view there is provided, in accordance with the invention, a method for an energy-saving operation of a unit, which includes: changing a control unit from an active mode into a quiescent mode, the control unit consuming less current in the quiescent mode than in the active mode and there being no time base available in the control unit in the quiescent mode; feeding signals to the control unit from an external time base at predefined time intervals; and forming via the control unit the time base by counting the signals for determining time.

A significant advantage of the invention is that, in order to span a predefined time period, the control unit is in the sleep mode for as long as possible. Should the sleep mode no longer be possible, the control unit is operated in the wait mode for as long as possible. The control unit thus consumes relatively little energy.

In accordance with an added feature of the invention, there are the steps of: feeding reset signals as the signals fed to the control unit by the external time base; switching the control unit into the active mode after the control unit receives the reset signal; counting in the control unit a number of received reset signals and subsequently changing back into the quiescent mode if the number of the received reset signals is lower than a predefined number during the active mode; changing the control unit to a wait mode if the number of the received reset signals is greater than the predefined number; starting an internal timer in the control unit during the wait mode; and switching via the internal timer the control unit into the active mode after expiry of a predefined residual time.

In accordance with an additional feature of the invention, there are the steps of determining with the control unit a number of the signals received from the external time base within a predefined time period, and determining with the control unit a residual time in which the predefined time period is longer than time passing during a reception of a previously determined number of the signals.

In accordance with another feature of the invention, there is the step of determining with the control unit a reset period defined as the time between a reception of two successive signals.

In accordance with a concomitant feature of the invention, there is the step of determining with the control unit a number of the signals received by the control unit during a predefined time period from the predefined time period and the reset period.

Other features which are considered as characteristic for the invention are set forth in the appended claims.

Although the invention is illustrated and described herein as embodied in a method for the energy-saving operation of a control unit, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 is a diagrammatic block diagram of a control unit having a reset module according to the invention;

FIG. 2 is a flow chart of a schematic program sequence; and

FIG. 3 is a timing diagram showing a variation over time of a reset signal and of operating modes of the control unit.

DESCRIPTION OF THE PREFERRED EMBODIMENTS

In all the figures of the drawing, sub-features and integral parts that correspond to one another bear the same reference symbol in each case. Referring now to the figures of the drawing in detail and first, particularly, to FIG. 1 thereof, there is shown a reset module 1 that is connected to a reset input of a control unit 2 via a reset line 6. The control unit 2 has an internal timer 3 and is additionally connected to a data memory 4. The output of the control unit 2 is led to an actuator element 5 via a control line 7. The actuator element 5 constitutes, for example, a switch for an LED display in a motor vehicle. The reset module 1 constitutes an external watchdog that has its own time base and periodically transmits a reset signal to the control unit 2 at predefined, constant time intervals. The periodically supplied reset signals constitute an external time base for the control unit 2. The control unit 2 has its own time base in a wait mode and in an active mode as a result of the internal timer 3. However, the internal timer 3 is switched off in a sleep mode so that in the sleep mode, the control unit 2 does not have its own time base with which the control unit 2 can measure the time.

The method according to the invention is explained in more detail with reference to the schematic program sequence in FIG. 2. At program point 10, the control unit 2 starts the method according to the invention and checks whether there is a request for a task to be processed. If the task does not need to be processed until after a predefined time period, for example in two seconds, the control unit 2 then changes into the sleep mode. In the sleep mode there is the least current demand and the control unit 2 cannot carry out any activities at all, at program point 11. However, in the sleep mode, the control unit 2 has to be driven by an external reset signal for the control unit 2 to be able to leave the sleep mode again.

After the reception of a reset signal from the reset module 1, the control unit 2 preferably changes synchronously into the sleep mode at program point 11. Since the periodically supplied reset signals constitute a time base, the control unit 2 can measure the time by counting the supplied reset signals.

At program point 12, the reset module 1 feeds a reset signal to the control unit 2 again. After the reception of the reset signal at program point 12, the control unit 2 changes, at program point 13, into an active mode in which the control unit 2 starts the internal timer 3. At the following program point 14, the reset module 1 transmits a reset signal to the control unit 2 again. After reception of the reset signal at program point 14, the control unit 2 determines the status of the internal timer 3 at program point 15, and thus determines the duration of a reset period, i.e. the time which lies between two reset signals of the reset module 1. By virtue of the duration of the reset period, the control unit 2 has a measure with which to measure the time.

Subsequently, the control unit 2 calculates the total Z of complete reset periods that pass in the predefined time period. The time difference between the reset time, which is timed by the total Z of reset periods, and the predefined time period is designated as residual time and is determined by the control unit 2. Thus, the time period ZS can be determined by the control unit 2 by counting the total Z of supplied reset signals and measuring the residual time by the internal timer 3.

The predefined time period prescribes, for example, the time at which a task has to be periodically processed. The task may consist, for example, in enabling an LED display in the display area of a motor vehicle to light up every 2 seconds for 20 msec.

However, it is possible for any other desired tasks to be processed at the predefined times.

An essential idea of the invention consists in the fact that the control unit 2 waits, in a fashion which is as energy-saving as possible, for a time period before becoming active again at a predefined time and carrying out a task. This task can also preferably consist in checking an input signal.

If the predefined time period is, for example, one second, and if the duration of a reset period is 300 milliseconds, the predefined time period is timed by three reset periods and a residual time of 100 milliseconds. The predefined time period is measured starting from program point 11 at which the control unit changes into the sleep mode.

The control unit 2 sets a first counter to the value 2 and additionally prescribes the total Z with the value 3. The first counter is set to the value 2, since two reset signals have already been fed to the control unit 2 and have been received during the determination of the reset period. The total Z constitutes the number of reset signals after which the control unit 2 changes into the wait mode.

In a simple embodiment, the duration of the reset period is known to the control unit 2, and the total of the reset signals after which the control unit 2 changes into the wait mode can thus be calculated without determining the duration of the reset period. The corresponding program points for the calculation of the duration of the reset period can thus be dispensed with.

Subsequently, at program point 16, the control unit changes into the sleep mode. At the following program point 17, the reset module 1 transmits a reset signal to the control unit 2 again. Subsequently, at program point 18, the control unit 2 increases the first counter by the value 1. At program point 19, the control unit 2 then checks whether the first counter has reached the total Z. If this is not the case, the program branches back to program point 16.

However, if the interrogation at program point 19 reveals that the first counter has reached the total Z, the program branches to program point 20. At program point 20, the control unit 2 changes into the wait mode in which the internal timer 3 is started. The internal timer 3 runs until the residual time and then transmits a control signal to the control unit 2 at program point 21. The control unit 2 then sets the counter of the internal timer 3 to zero at program point 22, and subsequently carries out a predefined task at program point 23. This consists, for example, in switching on the LED display of a motor vehicle for a predefined time. A program counter is then increased by the value 1.

Subsequently, the control unit 2 sets the first counter to the value zero and, at program point 24, checks how often the control unit 2 has carried out the predefined task. For this purpose, the program counter is compared with a maximum number. If the control unit 2 has still not carried out the predefined task more frequently than the maximum number, the program subsequently branches back to program point 16 and the program is run through again.

If, however, the interrogation at program point 24 reveals that the control unit 2 has already carried out the task more frequently than a predefined maximum number, the program counter is set to the value zero and the program branches back to program point 11 and the duration of the reset period of the reset module is determined again at the program points 11 to 15. This has the advantage that changes in the period duration of the reset module 1, which are caused, for example, by thermal influences or aging, are sensed and compensated.

FIG. 3 shows the characteristic curve 3a in which the reset signal of the reset module 1 is plotted against time t. In FIG. 3b, the mode of the control unit 2 is plotted synchronously. At the time T1, the control unit 2 changes, for a predefined time period (T2–T1), from the sleep mode S into the active mode A after the reception of the reset signal. Subsequently, the control unit 2 changes back into the sleep mode S at the time T2. The control unit 2 is not switched back into the active mode A by the reset signal of the reset module 1 until the time T3. At the time T3, the control unit 2 determines that the total of reset signals has been received, and at time T4 it therefore changes into the wait mode W in which the internal timer 3 is started.

After the expiry of the residual time RT=(T5–T4), the control unit 2 changes, at the time T5, into the active mode A in which the control unit 2 processes the predefined task. At the time T6, the predefined task is terminated and the control unit 2 changes back into the sleep mode.

The level of the signal in FIG. 3b is proportional to the power that the control unit 2 consumes in the corresponding state. It is clear that the time period in which the control unit 2 is operated in the active mode is relatively short and the control unit 2 is predominantly operated in the sleep mode or in the wait mode. In this way, the energy consumed by the control unit 2 is minimized.

We claim:

1. A method for an energy-saving operation of a unit, which comprises:

changing a control unit from an active mode into a quiescent mode, the control unit consuming less current in the quiescent mode than in the active mode and there being no time base available in the control unit in the quiescent mode;

feeding signals to the control unit from an external time base at predefined time intervals; and during the active mode, using the control unit to form the time base by counting the signals and subsequently changing back into the quiescent mode.

2. The method according to claim 1, which comprises:

feeding reset signals as the signals fed to the control unit by the external time base;

switching the control unit into the active mode after the control unit receives the reset signal;

during the active mode, using the control unit to form the time base by counting the reset signals and subsequently changing back into the quiescent mode if the number of the received reset signals is lower than a predefined number;

changing the control unit to a wait mode if the number of the received reset signals is greater than the predefined number;

starting an internal timer in the control unit during the wait mode; and switching the control unit into the active mode after expiry of a predefined residual time is determined to have occurred by the internal timer.

3. The method according to claim 1, which comprises determining with the control unit a number of the signals received from the external time base within a predefined time period, and determining with the control unit a residual time in which the predefined time period is longer than time passing during a reception of a previously determined number of the signals.

4. The method according to claim 1, which comprises determining with the control unit a reset period defined as the time between a reception of two successive signals.

5. The method according to claim 4, which comprises determining with the control unit a number of the signals received by the control unit during a predefined time period from the predefined time period and the reset period.

* * * * *